Jan. 28, 1958    C. C. RAYBURN ET AL    2,821,159
NOTCH TINNER

Filed Jan. 23, 1956    9 Sheets-Sheet 3

INVENTORS
Herman A. Schmidt
Charles C. Rayburn
BY James G. Black Jr.
Donald P. Smith
Attorney Jan. 28, 1958   C. C. RAYBURN ET AL   2,821,159
NOTCH TINNER
Filed Jan. 23, 1956   9 Sheets-Sheet 4

INVENTORS
Herman A. Schmidt
Charles C. Rayburn
BY James G. Black Jr.
Donald P. Smith
Attorney cally the invention comprehends a pair of
United States Patent Office 2,821,159
Patented Jan. 28, 1958

2,821,159

NOTCH TINNER

Charles C. Rayburn and James G. Black, Jr., Falls Church, Va., and Herman A. Schmidt, Washington, D. C., assignors to ACF Industries, Incorporated, New York, N. Y., a corporation of New Jersey Application January 23, 1956, Serial No. 560,716

29 Claims. (Cl. 118—6)

This invention relates to improvements in an apparatus for sequentially applying solder to the several marginal edges of flat polygonal ceramic wafers. In the manufacture of module assemblies and in forming ceramic modules for use in electronics it has been proposed to provide these ceramics in the form of square flat wafers, the edges of which are formed with spaced notches. The notches comprehend the areas to which electrical connections are to be made and it is, therefore, essential that such notches be provided with proper deposits of solder.

One of the objects of the present invention is to provide a mechanism including means for automatically moving jigs from station to station, the jigs each holding a plurality of wafers and presenting the edges of the wafers sequentially to flux and solder contained in suitable receptacles.

A further object of the invention is to provide containers for flux and solder and mounting the containers on vertically movable supports so that these containers can be elevated to a position for suitably immersing the ceramics which are held in the jigs, the movement of the containers being synchronized with the movement of the jigs.

Another object of the invention is to provide a feed means for a series of jigs loaded with ceramic wafers whereby the jigs will be moved from station to station for synchronized manipulation enabling the various sides of the ceramic to be properly presented to the flux or solder and finally moved and unloaded after completion of the operation.

The invention further comprehends the use of an automatic mechanism for rotating the jigs on their own axes to present the various marginal edges of the ceramics in position for immersion in the tanks containing the flux or solder.

More specifically the invention comprehends a pair of guide rails upon which jigs are arranged, the jigs carrying suitably arranged ceramic wafers. Mechanism is provided for a step by step feeding of the jigs along the guide rails to stations available adjacent vertically movable flux and solder receptacles and at these stations mechanism is arranged for rotating the jigs to present the several edges of the ceramics for immersion in the flux and solder contained in the receptacles.

Further, the invention comprehends power means for moving the several associated parts and timing means for synchronizing the movement of the parts for cooperation with the mechanism.

These and other objects of the invention will more clearly hereinafter appear by reference to the accompanying drawings forming a part of the instant application and wherein like characters of reference designate corresponding parts throughout the several views, in which:

Figure 7:
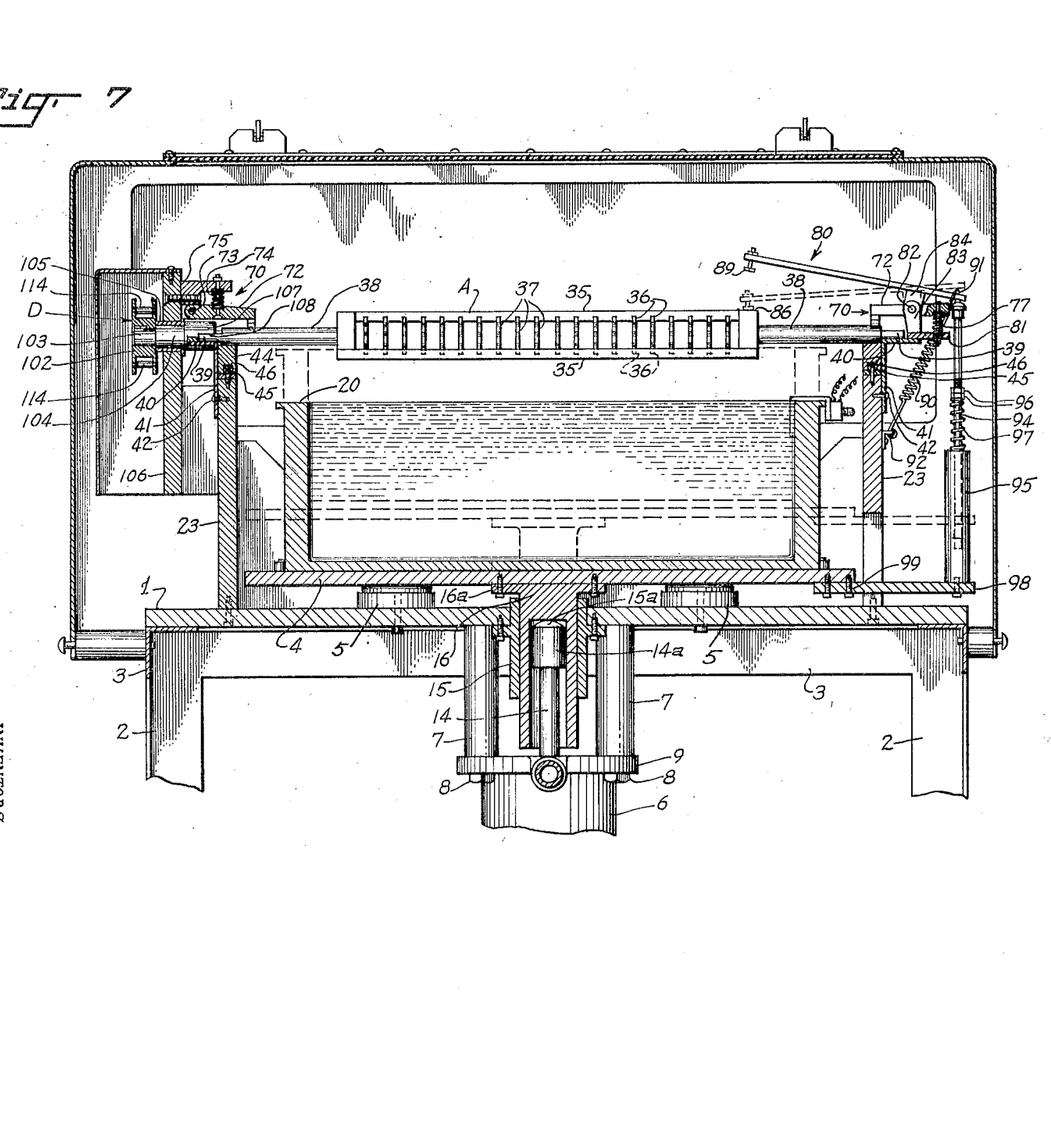
Fig. 7 is a transverse section on line 7—7 of Fig. 3.

In the present disclosure the notch tinning apparatus is shown as supported on a table including the top 1, vertical supports 2 and marginal horizontal braces 3. Supported on this table is a vertically movable platform 4 normally spaced from the table top 1 by resilient supports 5 to provide a space for connecting parts of the elevating mechanism and permitting suitable ventilation, and arrangement of a switching means as hereinafter described. The elevating mechanism for the platform 4 includes the cylinder 6 suspended by tubular hangers 7, the hangers including bolts 8 which extend through the hangers and the upper flange 9 of the cylinder 6. The cylinder is of conventional type, including the compressed air inlet 10 and the metered exhaust valve 11, the latter acting as a control for regulating the elevating and lowering of the platform 4. Within the cylinder 6 is the piston 12 which is reciprocated by air pressure supplied to the cylinder through inlet 10, and to this piston is fixed the connecting rod 14 which extends through the upper cylinder wall 9ª and into the downwardly facing cylindrical socket 15 to a solid annular head portion 16 having flange 16ª fixed to the bottom face of the platform 4. The upper end of the rod 14 which is located in the cylinder socket 15 is formed with elongated cylindrical enlargement 14ª and a rounded extremity 15ª (Fig. 7). This structure provides for the proper application of thrust to the cylinder and permits the application of the vertical forces to a central point to insure against tilting of the receptacles being elevated and lowered.

Figure 6:
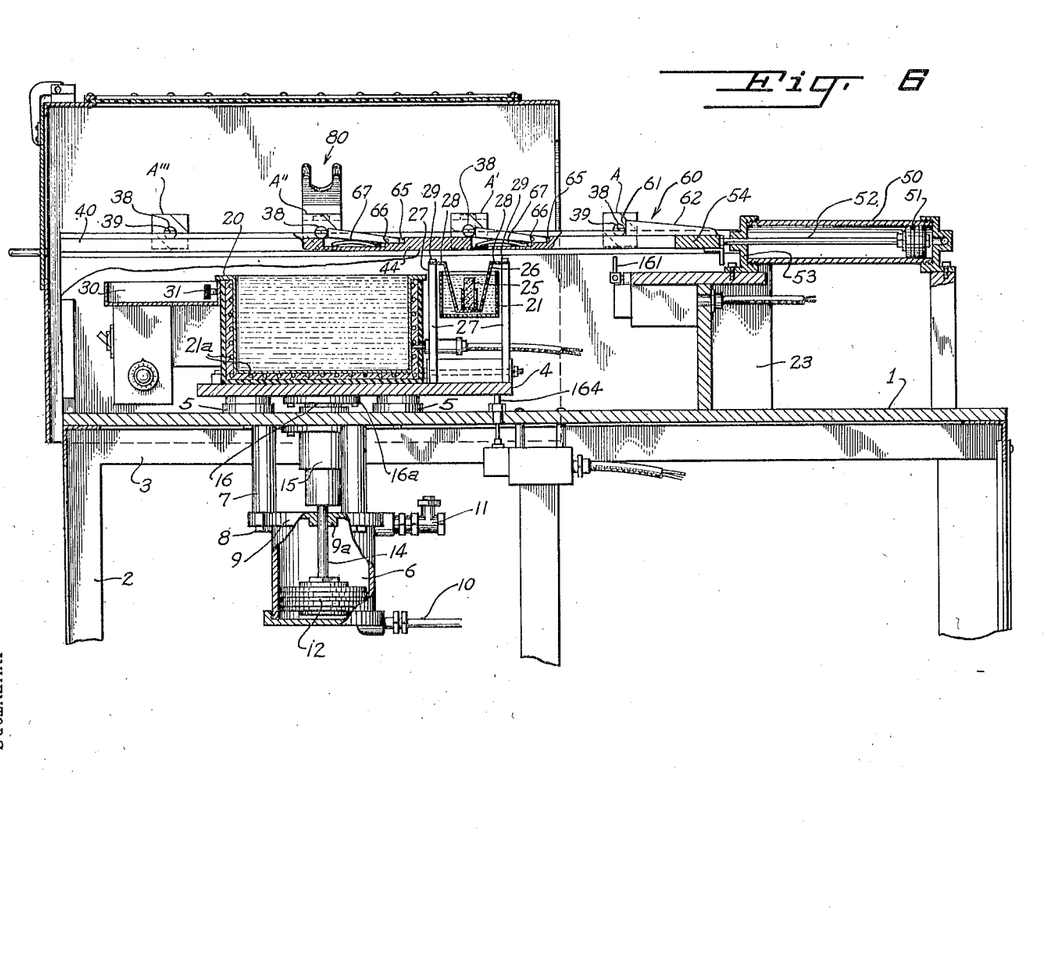
Fig. 6 is a longitudinal vertical section taken on line 6—6 of Fig. 3.

By this structure the platform 4 can be elevated vertically a distance defined by the stroke of the piston 12 and will be gradually lowered by gravity after each vertical timed movement as determined by the adjustable exhaust valve 11 and controlling relays. On the platform 4 is arranged a heated solder pot 20 and the flux receptacle 21, the solder pot 20 being adapted to contain solder up to the level of its sidewalls and the level of the flux in the receptacle 21 being substantially identical with the solder level. The solder pot 20 may be heated by any suitable means such as the electric heating means 21ª formed in the wall thereof. The flux receptacle 21 is of rectangular form having its end walls supported in brackets 22 fixed to the side panels 23 supported on the table top 1. The side panels 23 are parallel and extend lengthwise of the table to provide trackage for supporting and guiding the jigs, as will more clearly hereinafter appear. Within the flux receptacle 21 is a wiper pad 25 suspended at each end by the hangers 26 supported by the uprights 27. The brackets 26 are generally of V-form with the wiper pad supported at the base of the V, the upper ends of the arms of the V-brackets 26 extending laterally as at 28 to overlie the top of the uprights 27 and are secured thereto by bolts 29, as best shown in Fig. 6. The wiper pad 25 has its upper wiping surface below the surface of the flux contained in the receptacle 21. At the other side of the solder pot 20 and affixed thereto is a rectangular scale pan 30 which is secured immediately below the upper marginal edge of the solder pot 20 by thumb screws 31. This pan 30 is positioned so as to underlie the jig which has been removed from the solder pot and will provide means for receiving any waste or discharge from the jig.

Obviously from the foregoing it will be apparent that the operation of the piston 12 in the air cylinder 6 which is positioned below and suspended from the table top 1 will result in an elevation of the platform 4 and of the solder pot 20, the flux receptacle 21 and the attached scale pan 30. It will be understood that the temperature of the solder is controlled and this in turn controls the operation of the mechanical mechanism, as will be hereinafter more fully described.

Figure 8:
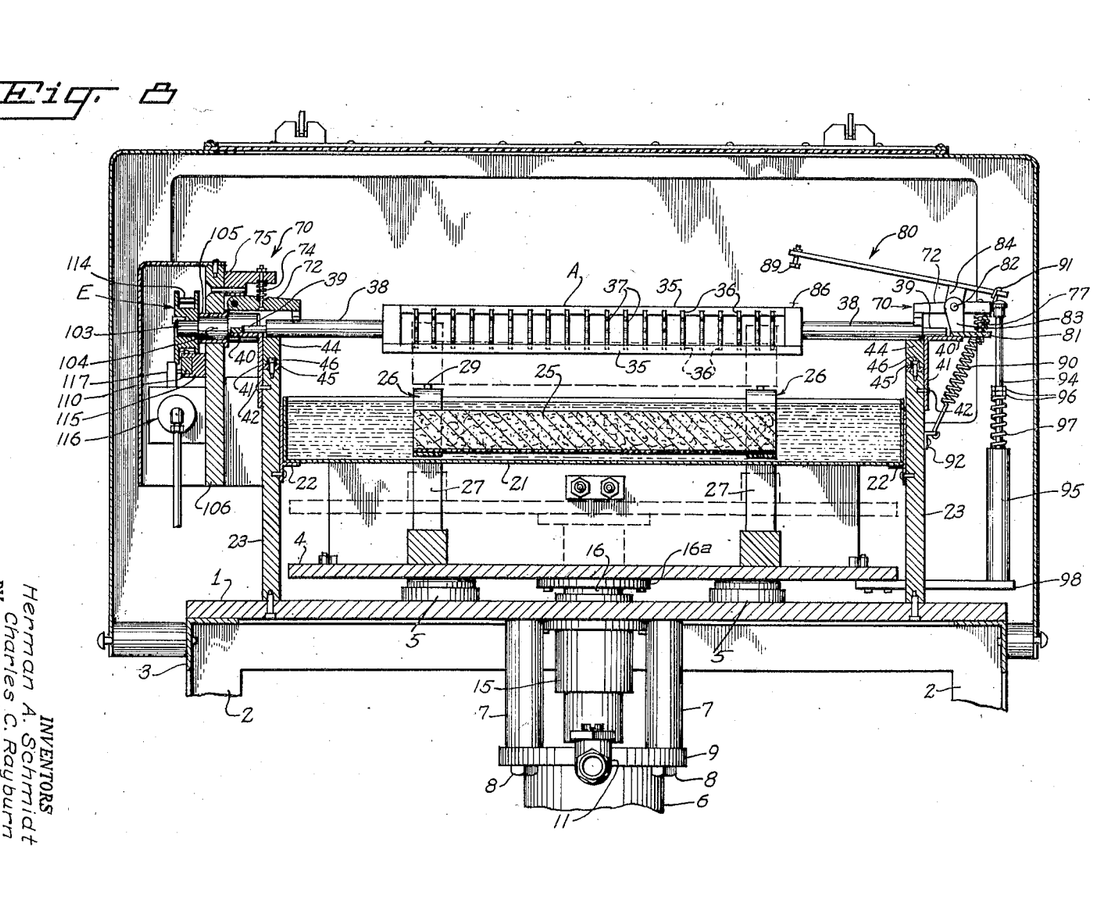
Fig. 8 is a transverse section on line 8—8 of Fig. 3.

The ceramic wafers to be tinned or soldered are carried in jigs indicated by reference character A, these jigs being of different types and form to accommodate various operations and ceramics, one form of a jig being illustrated in Figs. 7 and 8. The jigs basically include spaced rails 35 which have oppositely aligned slots 36 in which the ceramic wafers 37 have been manually positioned so as to present the four sides of the wafer with its several notches in each of the four sides and so that these four sides may be submerged in the flux and solder upon the upward movement of the platform 4 as heretofore mentioned and as shown in dotted lines in Fig. 7 at 20ª.

Figures 10, 11:
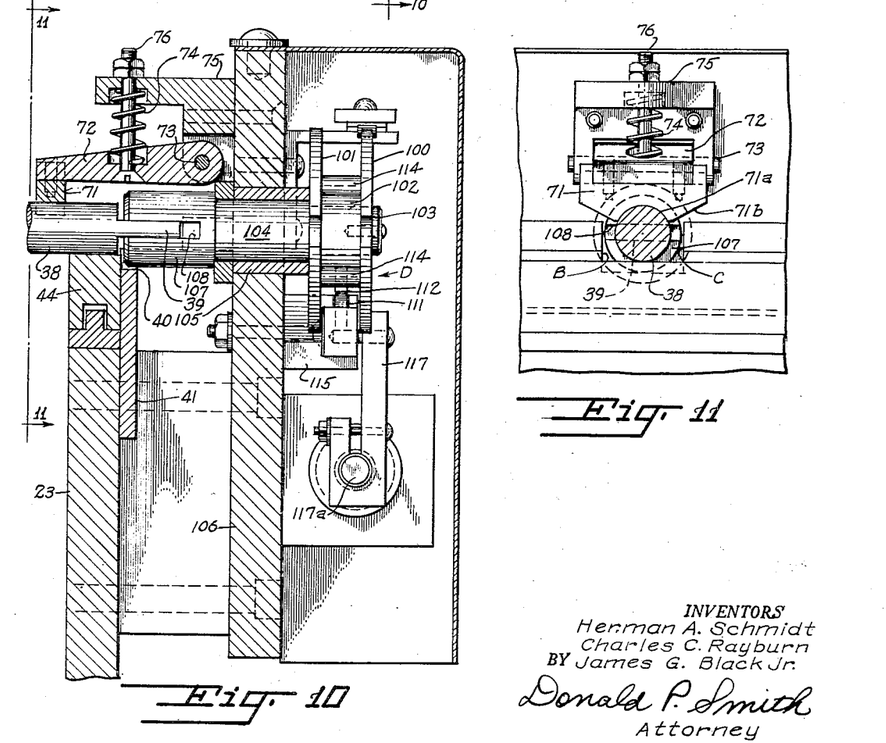
Fig. 10 is a section on line 10—10 of Fig. 9.
Fig. 11 is a fragmentary elevation taken on line 11—11 of Fig. 10.

Each jig includes supporting shafts extending axially at each end and indicated at 38, the extremities of these supporting shafts being reduced and flattened as at 39 for engagement and travel along the lateral elevated tracks 40. These tracks are of angular form, having their vertical portion 41 fastened by screws 42 to the outer face of the side panels 23 and their horizontal portions 40 located above and projecting laterally of the slide elements 44. As shown in Figs. 10 and 11 one of the tracks is notched at spaced points B and C for the passage of the clutch shaft of the rotating mechanism to be hereinafter described. The top faces of the side panels 23 form trackways for the slide members 44 which are spaced downwardly from the top surface of the elevated track portions 40 so that normally the jigs are supported by and travel on the lateral track faces 40. The slides 44 are longitudinally slotted along their bottom surface as at 45 to straddle guide pins or screws 46 fixed medially along the upper faces of the side panel 23, this structure permitting the slide member 44 to slide longitudinally of the side panels 23 by means of an air motor including a cylinder 50, piston 51 and piston rod 52, the latter being adjustably secured to a bracket 53 secured medially of the outer face of the cross connection 54 which extends between and connects the slides 44.

Figure 1:
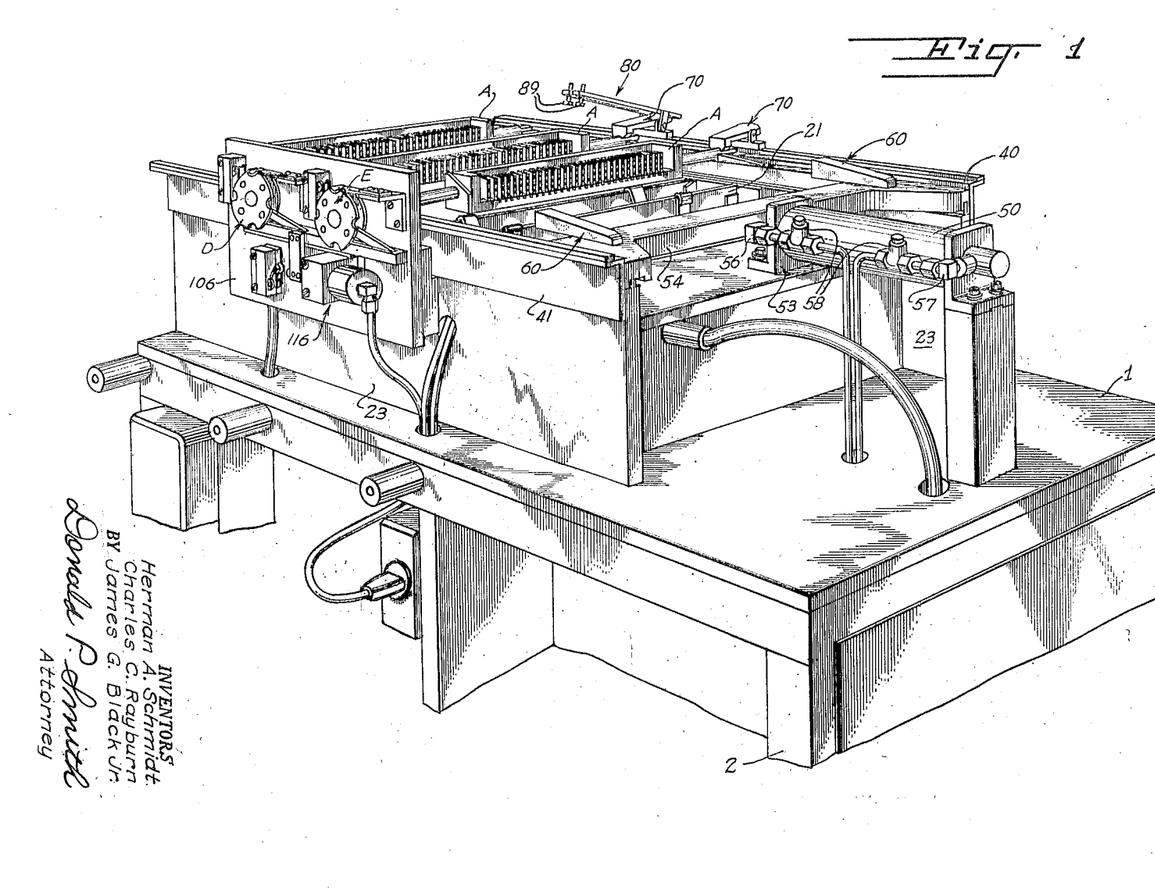
Fig. 1 is a perspective view of the assembly.
Figure 2:
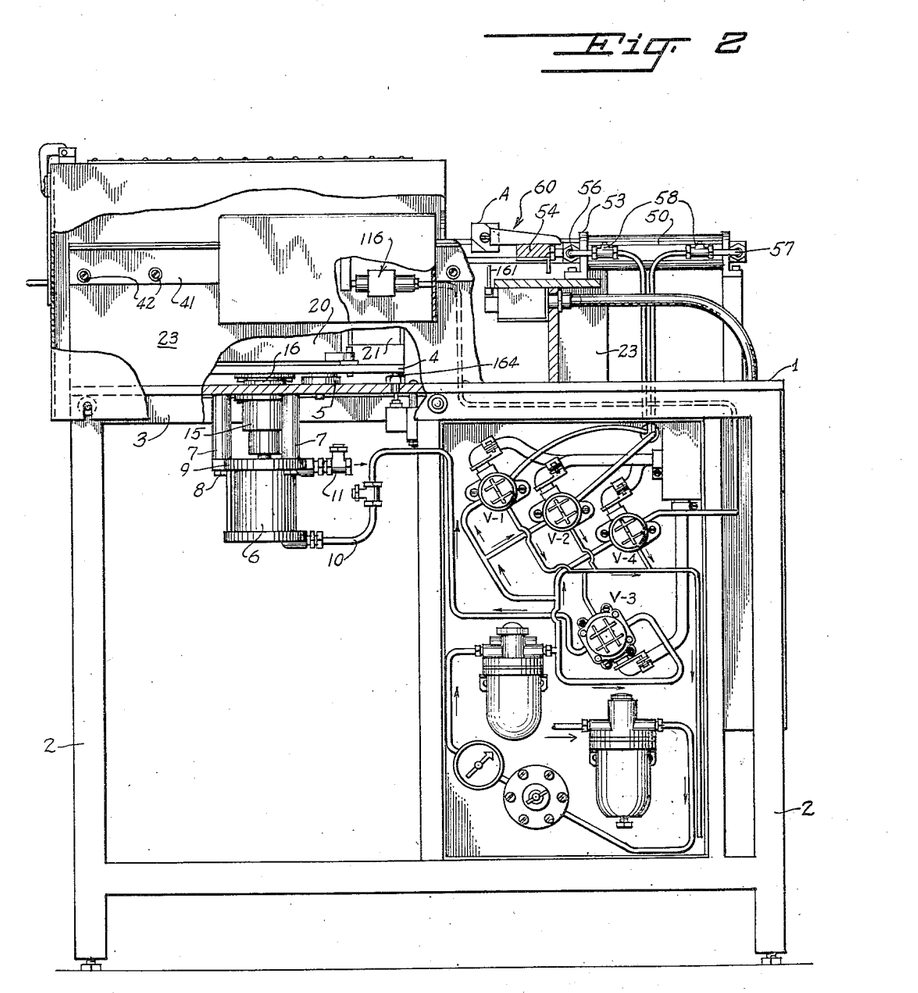
Fig. 2 is a side elevation of the apparatus with parts broken away in section to show certain of the mechanism.
Figure 3:
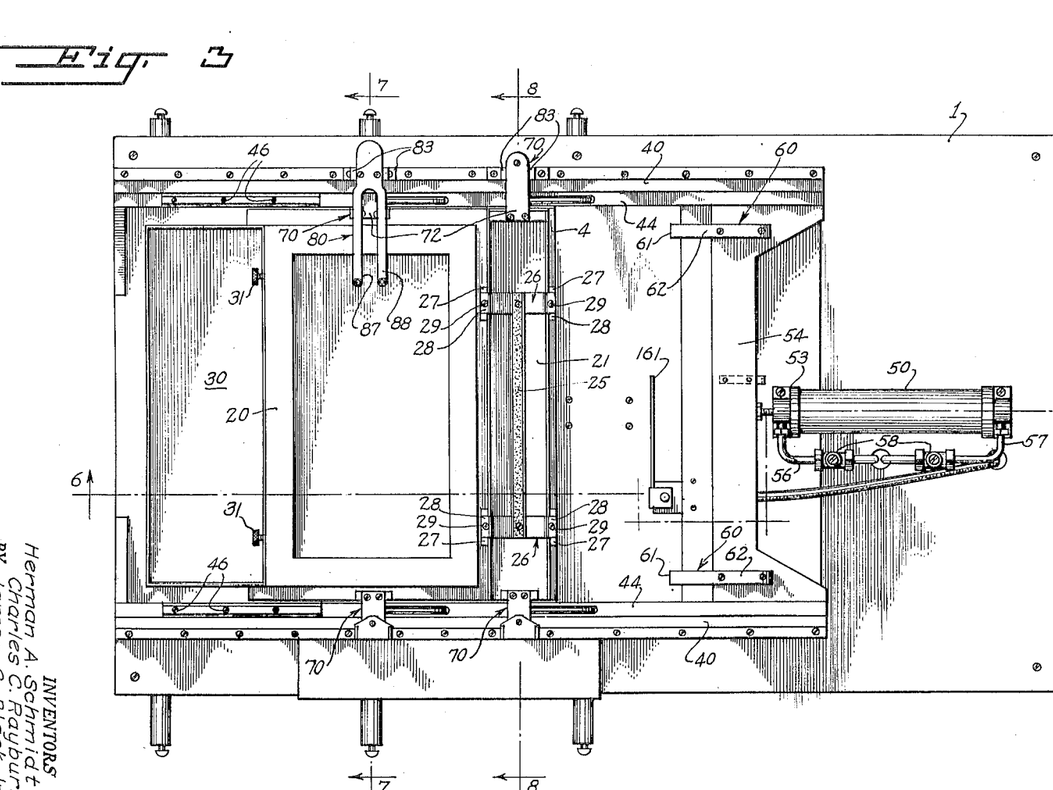
Fig. 3 is a top plan view.
Figure 4:
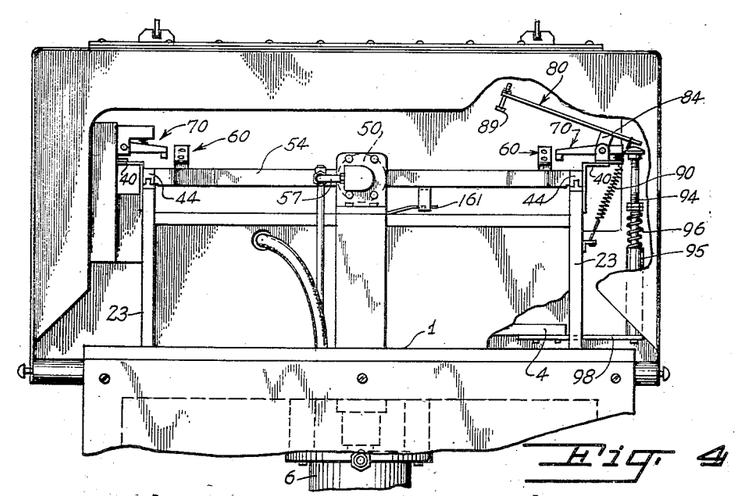
Fig. 4 is a partial end elevation with parts broken away, showing the hold-down mechanism.
Figure 5:
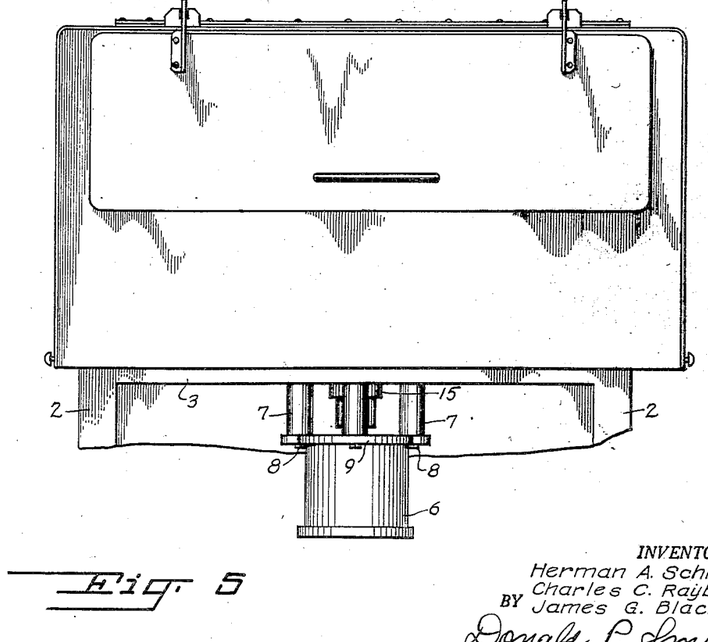
Fig. 5 is a partial end elevation of the opposite end of the apparatus.

By reference to Fig. 3 it will be seen that the air motor has compressed air connected at each end of the cylinder by pipe connections 56 and 57 through regulating valves 58 and it will be obvious that the movement of the slides 44 will be determined by the stroke of the air motor. The slides 44 are each provided with three sets of oppositely arranged triggers for engaging and feeding the jigs containing the ceramic wafers to the separate stations, i. e. the loading station, the fluxing station, soldering station and at the point of discharge. The first set of triggers 60 are positioned adjacent the motor end of the slides 44 and are formed with jig engaging flat vertical faces 61 and top outwardly inclined faces 62. The second and third trigger mechanisms are seated in spaced recesses 65 and all triggers have pivots 66 and are spring projected from their sockets by flat leaf springs 67 so that the free ends of the triggers project above the top surface of the rail and into a position for engaging the adjacent shaft portion of the arbor extremities 38. In the feeding of the jigs it will be noted that the first jig indicated in Fig. 6 at A will upon operation of the fluid motor be shifted to position A' and upon a second operation to position A2' and upon a third operation to position A3', the trigger structure moving the arbors forward but at the second and third positions being depressed upon reverse movement of the rails against the tension of their springs 67 to clear the arbors which are held down by the spring-urged hold-down clamps 70 positioned at each station.

While the hold-down clamps are slightly modified in their mounting at each side of the assembly, their general structure and function is identical. Each of the hold-down clamps includes a block 71, Figs. 10 and 11, these blocks having arcuate medial faces 71ª and lateral upwardly inclined faces 71ᵇ, the arcuate faces 71ª being adapted to snugly engage the shaft extensions 38 of the jigs while the inclined faces 71ᵇ coact with the moving jig shafts to permit their movement and engagement in the arcuate recesses. The blocks 71 are supported at the ends of pivoted arms 72 mounted on pivot pins 73 and are normally depressed by springs 74. At the left hand side of the assembly and adjacent the jigs rotating mechanism, the springs 74 are mounted on top of the pivoted arms 72 and are interposed between the top of these arms and a bracket 75. Bolts 76 are provided for mounting the springs.

At the right hand side of the assembly, as viewed in Fig. 7, the pivoted arms 72 are mounted on pivot pins 82 carried by upright ears 83 which extend upwardly from and are supported at the outer marginal edge of the projecting arm 81 supported on horizontal flange 40 of the track. In these latter hold-down clamps, the spring 77 is beneath the outer free end of the clamp arm 72 and is supported on the arm 81 fixed to the outer marginal edge of the flange 40 of the track. The spring 77 is held in place by the bolt 78 which extends through the pivoted arm 72 and into the arm 81, thereby firmly positioning the spring for proper seating movement of the clamp block. It will be noted that in both instances the ends of the coil springs, which are utilized in seating the clamp blocks, are arranged in appropriate recesses in the mechanism.

For holding each jig in such a position that the ceramic wafers are retained with their flat edges in a true horizontal position and parallel to the surface of the solder, an alignment mechanism is provided in the nature of a pivoted arm 80. This pivoted arm 80 is mounted on the pivot pin 82 extending through the spaced parallel ears 83 projecting upwardly from the arm 81. The pivoted aligning arm 80 includes the downwardly extending ears 84 which are located between the upwardly projecting ears 83, and the pin 82 extends through the ears 84 of the aligning arm and the supporting ears 83 to permit the aligning arm to swing on this pivot downwardly upon the top flat marginal edge 86 of the jig. By reference to Fig. 3 it will be seen that the alignment lever is formed at its outer extremity of two spaced arms 87 and 88 and adjustable contact elements 89 are provided in the extremity of each of these arms to provide an assembly which will hold the jig in true horizontal position. The alignment arm 80 is normally held in raised position by the coil spring 90 which is connected at 91 to the outer end of the arm 80 and also to the bracket 92 extending from the outside of the adjacent side rails 23. To actuate the alignment arm 80 there is a spring pressed rod 94 which extends into a cylinder 95. The rod 94 is provided with adjusting stop nuts 96 and between these adjusting stop nuts 96 and the top of the rod 94 there is a coil spring 97 interposed. The cylinder 95 is supported on a lateral bracket 98 fixed to the bottom of the platform 4 by the bolts 99. By this arrangement as the platform 4 is elevated by the fluid motor, it lifts the supporting bracket 98 and the cylinder 95 vertically, compressing the spring 97 and under this spring pressure urging the rod 94 vertically to engage the outer free end of the alignment lever 80 effecting a tensioning pressure through this medium to engage and maintain the jig with the ceramics in true horizontal position.

Figure 9:
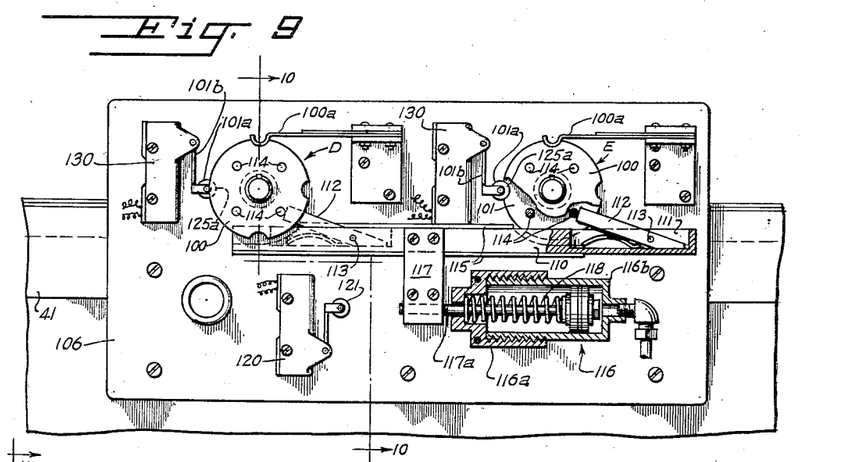
Fig. 9 is an enlarged elevation of the rotating mechanism for the jigs.

In Figs. 9 and 10 there is illustrated a mechanism for rotating the pair of jigs being treated in the flux tank and in the solder tank, it being obvious that a ceramic wafer of the type shown, having four sides, must be repositioned to bring the four sides in position for immersion in the flux or solder contained in the vertically movable tanks. It will also be obvious that the 90 degree turn of each of the jigs to present the four faces of the ceramic wafers to a position for immersion in the flux or solder must be synchronized with the operation of the air motor 50 operating the horizontal guideway and with the air motor 6 which is lifting the platform 4 containing the solder pot 20 and the flux receptacle 21. In other words, the 90 degree turns of the jigs must occur in synchronized relation with the four elevations of the platform 4 and once with the operation of the pressure cylinder 50 which reciprocates and changes the jigs' positions to the several stations. The mechanism for accomplishing the 90 degree rotational movement of the jigs includes ratchet-engaging wheels D and E. Each of these ratchet-engaging wheels include spaced discs 100 and 101 and medial hub portion 102. The hub portion 102 is hollow to receive the reduced extremity 103 of a shaft having an enlarged medial portion 104 mounted in bearings 105 in the frame member 106. The shaft extends through bearing portion 105 and terminates in an enlarged inner extremity 107 which is formed with a transverse slot 108. It will be noted that at each jig station, where the ends of the jigs are coupled with the rotating pawl mechanism, the angular track structure at 40 is cut away at B and C to permit the passage of the shaft 38 and the coupling thereof with the jig. The slot 108 in the extremity 107 receives the adjacent flat reduced extremity of the arbor and retains the latter in position so that rotation of the ratchet-engaging wheel will rotate the jig. For causing a quarter turn of the ratchet-engaging wheel, an elongated sliding pawl carrier 110 is provided, this pawl carrier having recesses 111 in which pawls 112 are located. The pawls 112 are pivoted at 113 and are spring urged to be normally positioned for engagement with pins 114 which are spaced at 90 degrees about the ratchet-engaging wheels and between the plates forming the ratchet-engaging wheel bodies. The sliding pawl carrier 110 is mounted in guide frame 115 fixed to the frame element 106. An air motor 116 is connected through vertical bracket 117 with the slide 110, this bracket 117 being fixed to the piston rod 117$^a$ of the air motor 116. A spring 118 is mounted on the piston rod 117$^a$, between the piston and the end of the cylinder, and functions to return the piston after its working stroke.

It will be noted that a switch 120 is fixed to the frame member 106, having its operating part 121 in the path of movement of the piston rod 117$^a$ of the air motor 116, whereby the switch is actuated at each power stroke of the motor to synchronize one of the included operations. The motor 116 is formed in two sections 116$^a$ and 116$^b$ threaded together permitting ready access to the working parts for adjustment or replacement.

It will be noted that the spaced discs 100 and 101 of the ratchet-engaging wheel are formed with arcuate recesses spaced at 90 degrees about the peripheral edges thereof, the notches or recesses in disc 100 functioning as positioning means cooperating with the spring stops 100$^a$ while the arcuate notches or recesses in the inner disc 101 cooperate with the roller 101$^a$ at the end of the switch arm 101$^b$ to cooperate with the control mechanism to synchronize the operation of the parts, as will be more fully hereinafter described.

The first function of the control circuit (Fig. 12) is provided whereby the machine can be turned on a preset time before operation is expected to commence without the attention of an operator. The primary function of the control circuit is to instrument a sequentially coordinated actuation of the various positioning and work movements of the machine, as well as to provide for safety features preventing operation under improper conditions.

Considering the instrumentation of these functions it will be appreciated from the description of the cycle of operation that before the soldering can begin, the solder in the bath must be in a molten state. As melting the solder in the pot requires a substantial time interval, a time switch 150 is provided having contacts driven by a clock motor M. By manual presetting, the contacts of the time switch 151 can be adjusted to close so that the solder bath will be molten at the outset of a work period. Connection of solder heat element 154 across power source input 155 is provided through plug terminals 152 and bimetallic thermostat switch 153. The thermostat switch 153 opens when the solder bath exceeds a temperature sufficient to maintain a liquid state preventing the overheating of the bath and reducing thereby the tendency for a scum to accumulate on the molten surface exposed to the atmosphere.

The second function, that of preventing operation of the machine before the solder is molten, is implemented by another thermostatic switch 157 also subjected to the temperature of the solder pot. When the pot reaches operating temperature, switch 157 opens, thereby de-energizing relay R' and closing contact R$^{1a}$ to permit operation of the machine. Pilot light 158 is turned on by contact R$^{1a}$ to indicate that the operating temperature has been reached and that operation may commence. Another pilot light 159 indicates that the power is connected to the control circuit by manual actuation of switch 156. When both pilot lamps 158 and 159 are on the machine is ready to be operated.

Consider now the primary function of the control circuit, that of providing a proper sequence of motions. As stated heretofore, one cycle of this sequence consists of a forward horizontal translation of the wafer racks into juxtaposition with either flux bath or solder bath, while each vertical reciprocation of the flux and solder pots initiates a 90 degree rotation of the wafer racks. An alternate pattern of operation is possible whereby only one side of the quadrilateral wafers will be soldered. Each cycle of operation is initiated by manual actuation of start switch 160 at the discretion of the operator after placing a rack into the loading station. Thereafter operation through one cycle is completely automatic, allowing the operator to meantime load another rack. The completion of each motion, be it translation of the wafer rack or solder and flux pots, or rotation of the wafer racks, is sensed by limit switches which serve to energize relay switches which in turn control actuating valves for the various air-servo pistons.

Figure 12:
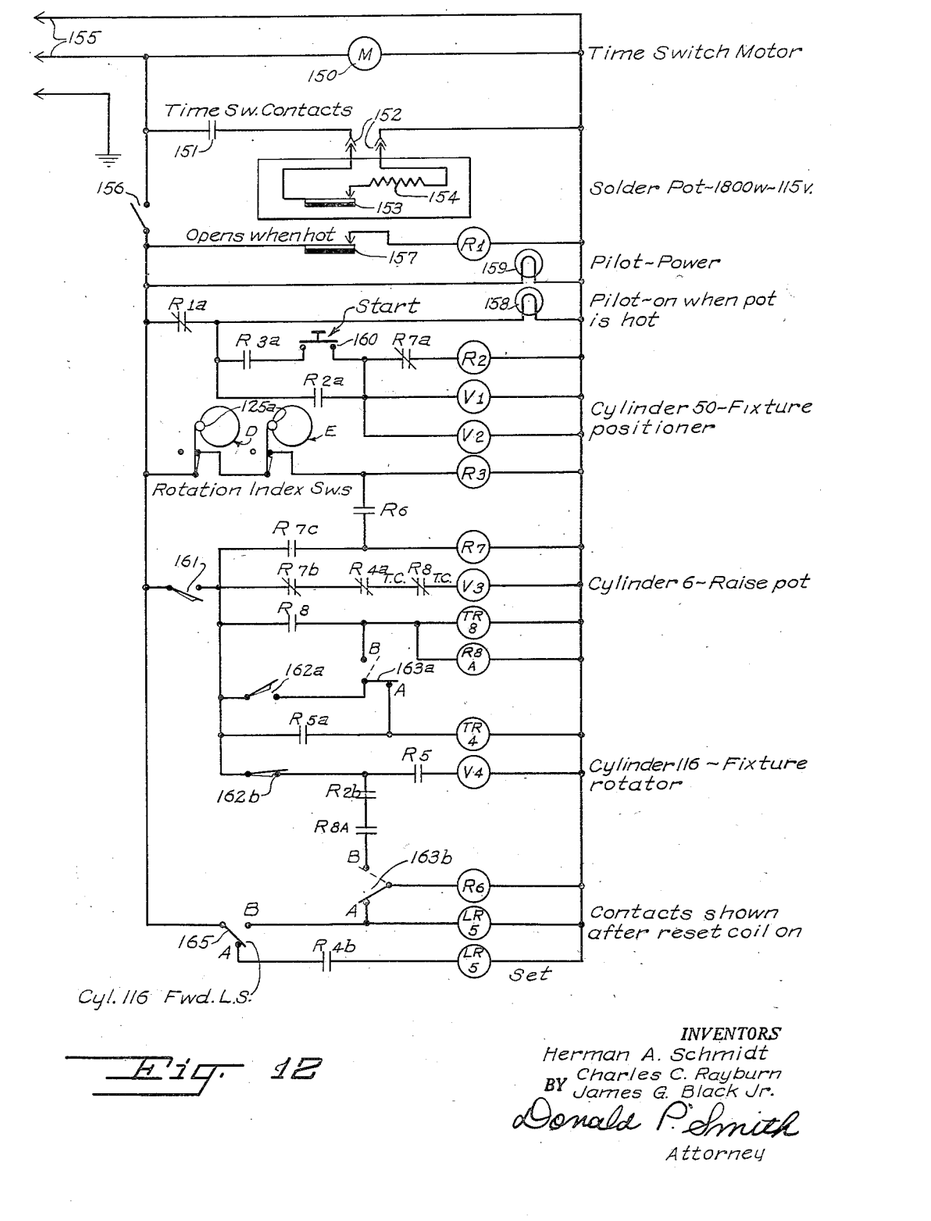
Fig. 12 is a wiring diagram showing the controls of the apparatus.

The first step in each cycle requires actuation of fixture positioning piston 51 by supplying air to the horizontal piston 50 through valves V$^1$ and V$^2$ (Fig. 12). The circuit across the power line which must be completed to energize V$^1$ and V$^2$ includes the manual start switch 160 and contact R$^{3a}$ of relay R$^3$. The contacts R$^{3a}$ will be closed only when the rotation index switches 130 are both closed by having notches 125$^a$ in zero position. This is necessary to provide an unobstructed path for the engagement of the flat reduced extremity of the arbor into slot 108 of the rotational hub. Valves V$^1$ and V$^2$ are held on after the manual release of the start switch 160 by series connected contact R$^{2a}$ of relay R$^2$. They remain on until contact R$^{7a}$ is broken, as hereinafter described.

Termination of the forward stroke of horizontal piston 51 is sensed by the forward limit switch 161 which applies power to the valve V$^3$, via relay switch contacts R$^{7b}$, R$^{4a}$TC, and R$^8$TC, all normally closed. Valve V$^3$ supplies air elevator piston 12, via inlet 10, thereby raising the solder and flux baths upward toward the already positioned wafer racks.

Upon initiation of the upward stroke of the solder and flux pots, the contacts 162$^a$ of the down limit switch is opened. The sequence to follow determining whether four sides, or only one side of the wafers receive solder, is controlled by switches 163$^a$ and 163$^b$ each with manually set contacts A and B. Consider first the A position of switches 163$^a$ and 163$^b$ whereby all four sides of the wafers are soldered. Timed relay TR4 is energized through limit switch 162$^a$ and the A contact of 163; this causes raise pot cylinder valve V$^3$ to remain on a preset time, holding the baths in their elevated position long enough to complete the fluxing and soldering operations. Contact R$^{4b}$ of relay R$^4$ sets latching relay LR5 which closes contacts R$^{5a}$, thereby by-passing contact 162 and holding on time relay TR4. After the preset time has elapsed, timed relay TR4 disconnects V$^3$ through contacts R$^{4a}$ and the pot falls to its lowermost position. Contact 162$^b$ of the pot down-limit switch is thereupon closed and the fixture rotator 116 is supplied with air pressure via valve V$^4$ and contact R$^{5b}$ of latching relay LR5. After the forward stroke of the fixture rotator is completed, limit switch 165 is moved to its B position, latching relay LR5 being thereby reset and relay switch R6 being energized. Contact R$^{5a}$ of latching relay LR5 is opened disconnecting relay TR4 (which controls the raise pot valve V$^3$); R$^{5b}$ is oepned deenergizing fixture rotator valve V$^4$, thereby allowing the pawl to retract into its initial position.

Upon retraction of the fixture rotating cylinder, limit switch 165 returns to the A position so that latching relay LR5 is again set, contacts R$^{4a}$TC are closed and the pot again rises. The cycle of pot reciprocation and fixture rotation through 90 degrees continues in the afore-described manner until rotation index switches 130 are closed while forward limit switch 165 is in its B position. This combination completes the circuit through relay R$^7$; contact R$^{7c}$ holding relay R$^7$ on, and contact R$^{7b}$ (normally closed) opening to prevent the raise pot valve V$^3$ from being energized. Normally closed contact R$^{7a}$ opens deenergizing relay R2 and removing the power from fixture positioning valves V$^1$ and V$^2$ which allows the horizontal slide frame to retract to its initial position. A cycle is now complete and further operation awaits manual actuation of start button 160.

When the machine is used to solder only one side of a wafer, switches 163$^a$ and 163$^b$ are placed in their B positions. The cycle proceeds in the normal sequence until the solder pot rises. The down limit switch 162$^a$ energizes time relay TR8 and relay 8$^a$1 relay contact R$^8$ holds both relays on. After the preset time delay of relay TR8, contact R$^8$TC is opened, deenergizing the valve V$^3$ which lowers the solder and flux pots. Upon reaching the lowermost position, down limit switch 162$^b$ is closed energizing relay R$^6$ through contacts R$^{8a}$ and R$^{2b}$. With the rotation index switches 130 in the zero or closed position, relay R$^7$ is energized, opening contact R$^{7b}$, thereby preventing further cycling of the solder and flux pots until a complete rotation of the rotation index cams has been completed. Relay R$^7$ is deenergized again when the horizontal slide frame is retracted with the consequent opening of limit switch 161.

As has been shown and described, the present apparatus is capable for use in handling both rotatable and non-rotatable jigs. When the jigs are to be rotated by the mechanism of Figs. 9 and 10, to provide 90 degree turns of the jig structures, the main circuit functions to control and operate the necessary mechanism. When the jig is not to be rotated, this circuit is disabled so that the jigs are not subject to movement about their axes. In either instance, the feeding of the jigs through the machine is identical, i. e. the jig shafts 38 and the flat terminals 39 thereof travel forward by virtue of the actuation of the piston 51 in the motor cylinder 50 which actuates the slide frame and with it the triggers 60, the latter directly engaging the jig shafts 38 and moving the jigs with the flat faces of the projections 39 in sliding engagement with the tracks 40. The flat terminals 39 of the jigs are at such an elevation and remain in such a plane that they move into the slots 108 in the driving shaft 107, and are free to pass through these slots 108 in the driving shaft 107 at the approximate time provided for by the synchronizing mechanism described. In other words, if the jigs are to be rotated to present the four faces of the square ceramic wafers to the flux and solder, the fourth ninety degree turn of the driving shaft 107 terminates with the slot 108 in a horizontal plane for the reception or discharge of the flat terminals 39 of the jigs. Normally the jigs are kept from misalignment with the hubs by virtue of the hold-down mechanisms mounted on the arms 72, these hold-down arms being of such a character as to permit the entrance and exit of the jig shafts from the driving hubs by the action of the reciprocating slides and their associated triggers 60. Obviously this arrangement provides a machine of great flexibility and a machine which requires no changes and alterations to permit the handling of rotary or non-rotary jigs.

What we claim is:

1. In an apparatus of the class described, a supporting structure, a pair of spaced guide rails mounted on the supporting structure, said guide rails being adapted to provide a runway and support for a plurality of jigs, said jigs being adapted to support and expose marginal portions of articles carried thereby, power means for advancing said jigs along said rails to predetermined stations, spring actuated clamp means for holding said jigs at said stations when the advancing means is retracted, clutch means for engaging said jigs at said station, power means for rotating said clutch means about their axes, a platform carried by said supporting structure, receptacles mounted on said platform and adapted to contain flux and solder, and means for elevating said platform to submerge portions of the articles carried in said jigs and for repeating this operation as the jigs are rotated about their axes to present additional edge portions of the articles.

2. The structure of claim 1 characterized in that the power means for advancing the jigs along the rail to predetermined stations includes a reciprocating motor and a slide frame carried thereby, the slide frame including spring projected trigger means.

3. The structure of claim 1 characterized in that the means for elevating the platform carrying the flux and solder receptacles includes a vertically arranged fluid motor suspended by the supporting structure and having a plunger operatively engaging the platform.

4. In an apparatus of the class described, a supporting structure, a pair of spaced guide rails mounted on the supporting structure, said guide rails having upper portions for supporting a plurality of jigs and lower runways for suporting a slide frame, a reciprocating motor for actuating said slide frame, said slide frame including trigger means for engaging said jigs for advancing the same along the runways to predetermined positions, rotatable means mounted on the supporting structure at said positions for engaging said jigs, intermittently actuated means for actuating said rotatable means, a platform containing receptacles for flux and solder, and means for elevating said platform for immersing the articles carried in said jigs, the operation of said last-named means being synchronized with said intermittently actuated means.

5. In a notch tinning apparatus, a supporting structure, a pair of spaced parallel supporting panels mounted on said supporting structure, said supporting panels being provided at their upper marginal edges with guide rails for supporting a plurality of jigs, a slide frame mounted on said supporting panels for reciprocating movement therealong, said slide frames having projecting retractable fingers for engaging said jigs mounted on said guide rails for moving the same from station to station, a fluid motor for actuating said slide frame, means for locking said jigs at said stations to retain the same in position upon retraction of said slide frame, ratchet wheels positioned for engaging said jigs at said stations, power means for operating said ratchet wheels for rotating said jigs in a step by step movement for sequentially moving the various faces of said jigs to a position to be submerged in tanks containing flux and solder, said tanks containing the flux and solder being mounted on a vertically movable platform, power means for elevating said platform as each face of the jig is rotated to treating position by said power ratchet means, and means for advancing said slide frame to advance said jigs on said side rails upon treatment of all of the faces of the articles carried by said jigs.

6. The structure of claim 5 characterized in that a pair of fingers are provided for engaging each jig.

7. The structure of claim 5 characterized in that a pair of fingers for engaging each jig are arranged in spaced series for shifting the series of jigs on their trackways to the several stations in sequence.

8. The structure of claim 5 characterized in that means are provided for retaining the jigs in fixed position upon the partial rotation of the jigs by said ratchet means.

9. The structure of claim 5 characterized in that means are provided for securing the ratchet wheels in fixed position after each operation by the power means.

10. The structure of claim 5 characterized in that a control means is actuated by the platform for controlling the motor for sequential operation.

11. The structure of claim 5 characterized in that the motor for elevating the platform containing the receptacles holding the flux and solder is provided with a control vent means permitting the control and return of the platform by gravity.

12. The structure of claim 5 characterized in that the motor which actuates the slide frame is a fluid motor and is positively actuated by the admission of fluid at each side of the piston.

13. In an apparatus of the class described a supporting structure, spaced guide rails mounted on the supporting structure, a slide frame mounted on said guide rails, said slide frame including a plurality of retractable trigger means, supports carried by said guide rails and positioned thereabove, said supports including elongated angle plates having their upper leg portions positioned above the slide frame and extending laterally thereof for supporting the extremities of jig mechanisms, motor means for reciprocating said slide frame, a solder pot supported between said guide rails for vertical movement, motor means for moving said solder pot vertically, and means controlled by the actuation of said slide frame for operating said motor for elevating said solder pot.

14. In an apparatus of the class described, a supporting structure, spaced guide rails mounted on the supporting structure, a slide frame mounted on said guide rails, said slide frame including a plurality of retractable trigger means, supports caried by said guide rails and positioned thereabove, said supports including elongated angle plates having their upper leg portions positioned above the slide frame and extending laterally thereof for supporting the extremities of jig mechanisms, fluid motor means mounted on said supporting structure for reciprocating said slide frame, a solder pot supported between said guide rails for vertical movement, fluid motor means for moving said solder pot vertically, electro-magnetically operated valves for operating both of said fluid motors, and switch means controlled by the actuation of said slide frame for operating the electro-magnetic valve controlling the fluid motor for elevating said solder pot.

15. In a notch tinning apparatus, a supporting structure, a pair of spaced parallel supporting panels mounted on said supporting structure, said supporting panels being provided at their upper marginal edges with guide rails for supporting a plurality of jigs, a slide frame mounted on said supporting panels for reciprocating movement therealong, said slide frames having projecting retractable fingers for engaging said jigs mounted on said guide rails for moving the same from station to station, a fluid motor for actuating said slide frame, means for locking said jigs at said stations to retain the same in position upon retraction of said slide frame, ratchet wheel structures positioned for engaging each of said jigs at said stations, power means for operating said ratchet wheels for rotating said jigs in a step-by-step movement for sequentially moving the various faces of said jigs to a position to be submerged in tanks containing flux and solder, said tanks being mounted on a vertically movable platform, power means for elevating said platform as each face of the jig is rotated to treating position by said ratchet wheel structures, means for advancing said slide frame for moving said jigs on said slide frames upon treatment of all of the faces of the articles carried by said jigs, and means for actuating said platform elevating means by movement of said slide frame.

16. In an apparatus for tinning notches in ceramic wafers supported by jig members, a supporting structure, a pair of spaced parallel guide rails mounted on said supporting structure, slide rails carried by said guide rails and adapted to be reciprocated thereon, retractable trigger means carried by said slide rails and adapted to engage said jigs for moving the same in one direction, means carried by said guide rails for retaining said jigs at their stations upon movement by said retractable trigger means, power means for moving said slide rails, a vertically movable support carried by said supporting structure, a solder pot carried by said vertically movable support, a motor for elevating said support, and means for operating said motor actuated by movement of said slide rails.

17. In an apparatus for tinning notches in ceramic wafers carried by jig assemblies having aligned shaft extensions at each end, a supporting structure, a pair of spaced parallel guide rails mounted on said supporting structure, guide projections extending upwardly from said guide rails, a slide assembly including a pair of parallel slide arms and a cross connection carried by said guide rails and adapted to be reciprocated thereon, said slide arms having recesses in their bottom surface for receiving said guide projections, tracks extending laterally of said guide rails for supporting said jig assemblies and having their jig-engaging portions positioned above said slide rails, retractable trigger means carried by said slide assembly and adapted to engage said jigs to advance same along said tracks, motor means for reciprocating said slide assembly, and means for immersing portions of the ceramic wafers carried by said jigs in solder, said means being actuated by the operation of said motor.

18. The structure of claim 17 characterized in that means are provided for holding the jigs against rotation on their axes during immersion in the solder.

19. The structure of claim 17 characterized in that automatic intermittent rotary movement is provided for the jigs by a mechanism mounted on one of said guide rails.

20. The structure of claim 17 characterized in that automatic intermittent rotary means is provided for the jigs and said means is automatically controlled by the immersing means.

21. In an apparatus for tinning notches in ceramic wafers carried by jig assemblies having aligned shaft extensions at each end, a supporting structure, a pair of spaced parallel rails mounted on the supporting structure, jig-engaging and rotating means spaced along said guide rails at selected stations, means for moving jigs along said guide rails to said stations, means for intermittently partially rotating said jigs at said stations, and a solder pot carried by said supporting structure and movable to a position for immersing the ceramics carried by said jigs after the partial rotation of said jigs at said stations.

22. The structure of claim 21 characterized in that means are provided for securing the jigs at their stations and for preventing their rotation during immersion in the solder.

23. In a notch tinning apparatus for applying solder to the notches of flat square ceramic wafers having notches formed along their marginal edges, in combination, a plurality of jigs having means for engaging a plurality of wafers at their diametrically opposite corners and for retaining same in spaced parallel relation with their edges transversely aligned, means for supporting said jigs at their opposite end portions and for positioning and retaining said jigs in spaced relation at flux and solder stations, intermittently operated means for advancing said jigs while in their spaced relation along said supporting apparatus to and from said stations, flux and solder receptacles, means for elevating and lowering said flux and solder receptacles for intermittently immersing one marginal edge of each of the ceramics in said jigs, and means for partially rotating said jigs at said stations.

24. In a notch tinning apparatus for applying solder to the notches of flat polygonal ceramic wafers having notches formed along their marginal edges, in combination, a plurality of jigs having means for engaging a plurality of wafers at their diametrically opposite corners and for retaining same in spaced parallel relation with their edges transversely aligned, means for supporting said jigs at their opposite end portions and for positioning and retaining said jigs in spaced relation at flux and solder stations, intermittently operated means for advancing said jigs while in their spaced relation along said supporting apparatus to and from said stations, flux and solder receptacles, means for elevating and lowering said flux and solder receptacles for intermittently immersing one marginal edge of each of the ceramics in said jigs, and means for intermittently rotating said jigs to present the several faces of the wafers in position for immersion in said flux and solder.

25. The structure of claim 24 characterized in that the means for elevating and lowering the flux and solder receptacles is power driven and is controlled by the intermittently operated means for advancing the jigs.

26. The structure of claim 24 characterized in that the means for elevating and lowering the flux and solder receptacles for intermittently immersing one edge of the ceramic wafers in the jigs, controls the means for rotating the jigs.

27. The structure of claim 24 characterized in that means are provided for holding the jigs at their stations and for preventing movement on their axes during the immersion in the flux and solder.

28. The structure of claim 24 characterized in that the operating means for the several parts are actuated by fluid motors controlled by magnetic valves.

29. In a notch tinning apparatus for applying solder to the notches of flat square ceramic wafers having notches formed along their marginal edges, in combination, a plurality of jigs having means for engaging a plurality of wafers at their diametrically opposite corners and for retaining same in spaced parallel relation with their edges transversely aligned, means for supporting said jigs at their opposite end portions and for positioning and retaining said jigs in spaced relation at flux and solder stations, intermittently operated means for advancing said jigs while in their spaced relation along said supporting apparatus to and from said stations, flux and solder receptacles, and means for elevating and lowering said flux and solder receptacles for intermittently immersing one marginal edge of each of the ceramics in said jigs.

References Cited in the file of this patent

UNITED STATES PATENTS

| | | |
|---|---|---|
| 1,652,697 | Boettger | Dec. 13, 1927 |
| 2,508,200 | Tarlton | May 16, 1950 |
| 2,583,968 | Rousseau | Jan. 29, 1952 |
| 2,650,600 | Davis | Sept. 1, 1953 |
| 2,723,922 | Fleming | Nov. 15, 1955 |
| 2,735,398 | Orrell et al. | Feb. 21, 1956 |